Figure 1:
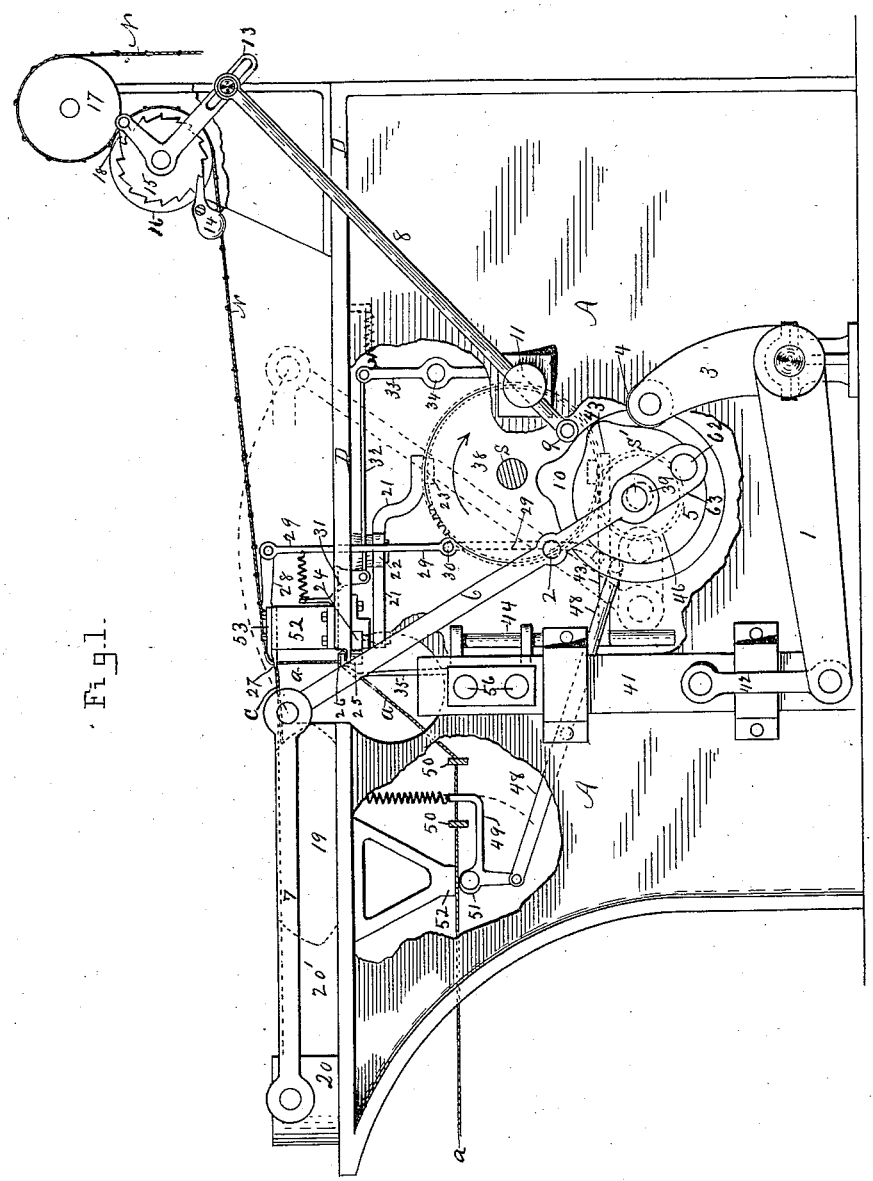

(No Model.) 5 Sheets—Sheet 1.

S. H. ROBERTS.
MACHINE FOR MAKING NETS.

No. 565,232. Patented Aug. 4, 1896.

Witnesses.
Ray Hutchins.
John F. Bray

Inventor:
Samuel H. Roberts

By Thos. H. Hutchins Attorney

THE NORRIS PETERS CO., PHOTO-LITHO., WASHINGTON, D. C.

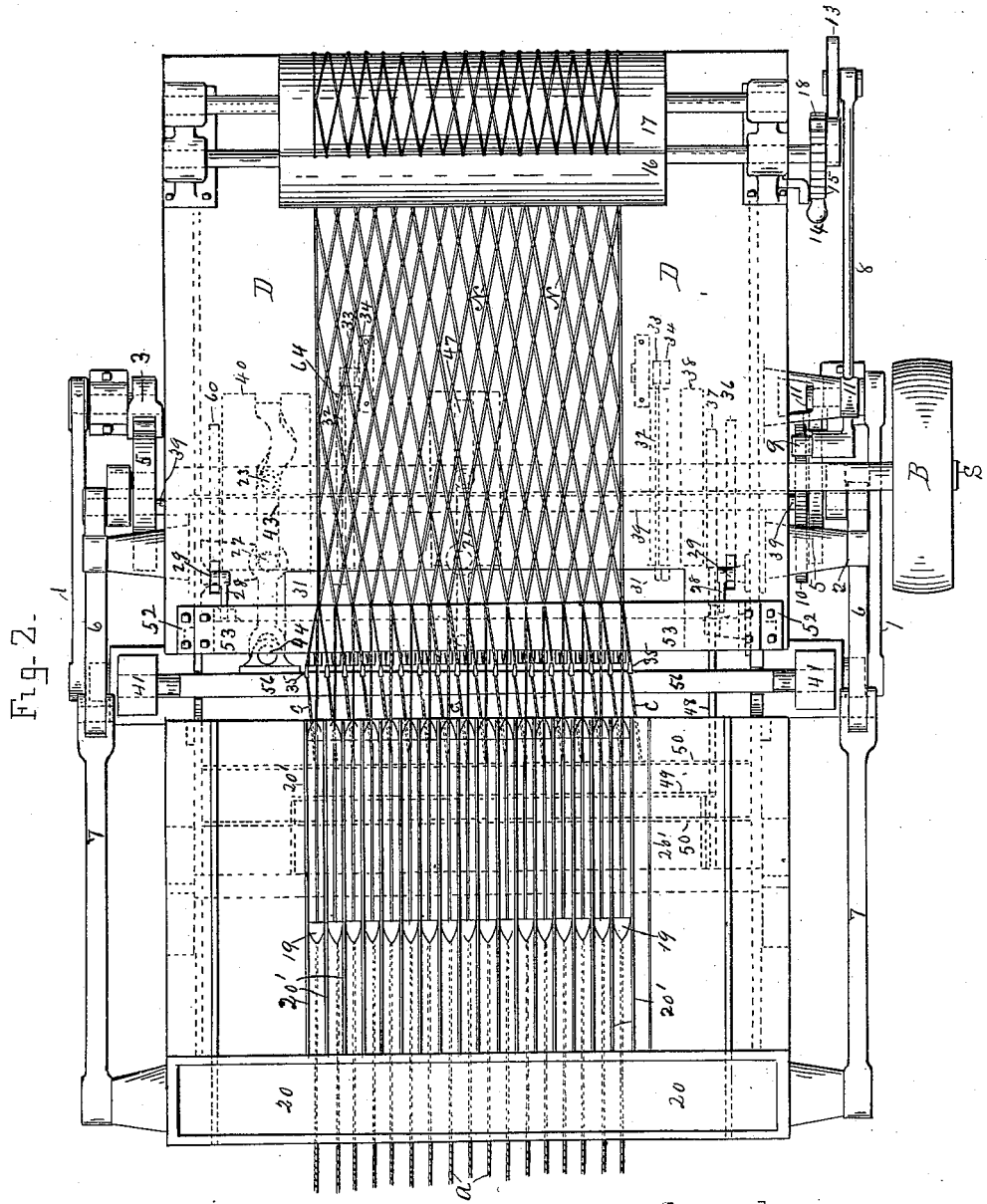

(No Model.) 5 Sheets—Sheet 3.
S. H. ROBERTS.
MACHINE FOR MAKING NETS.
No. 565,232. Patented Aug. 4, 1896.
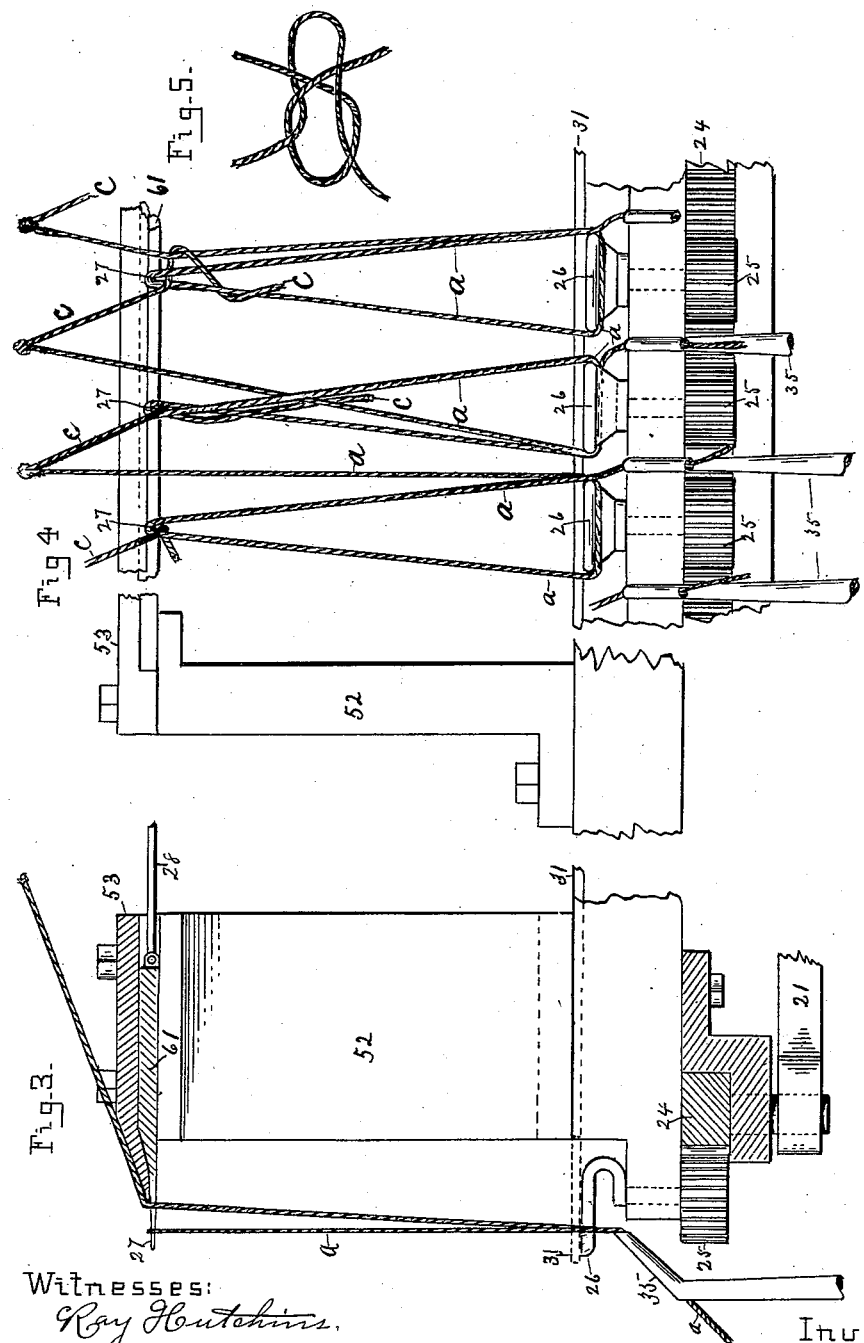

(No Model.) 5 Sheets—Sheet 4.
S. H. ROBERTS.
MACHINE FOR MAKING NETS.
No. 565,232. Patented Aug. 4, 1896.
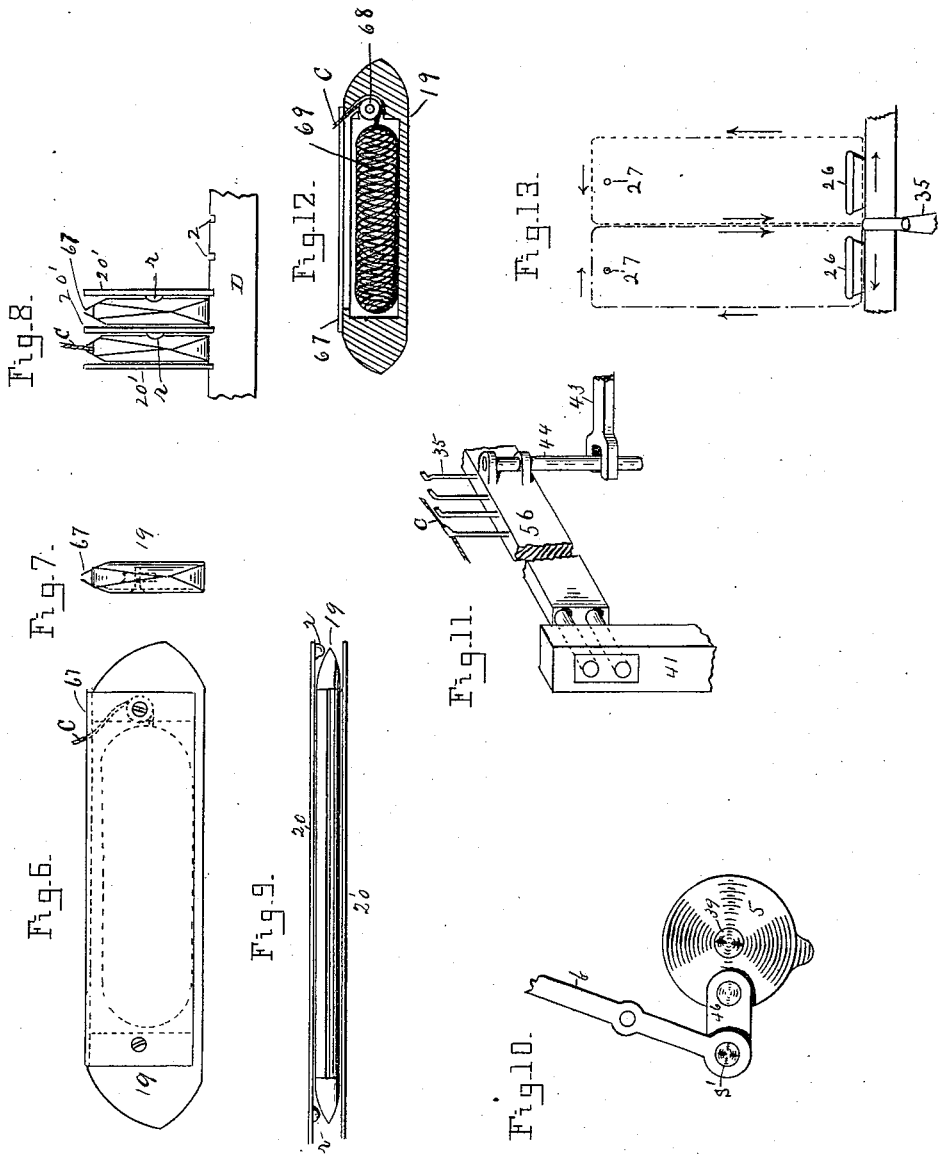
Witnesses:
Ray Hutchins
John F. Bray
Inventor:
Samuel H. Roberts
By Thos H Hutchins Attorney

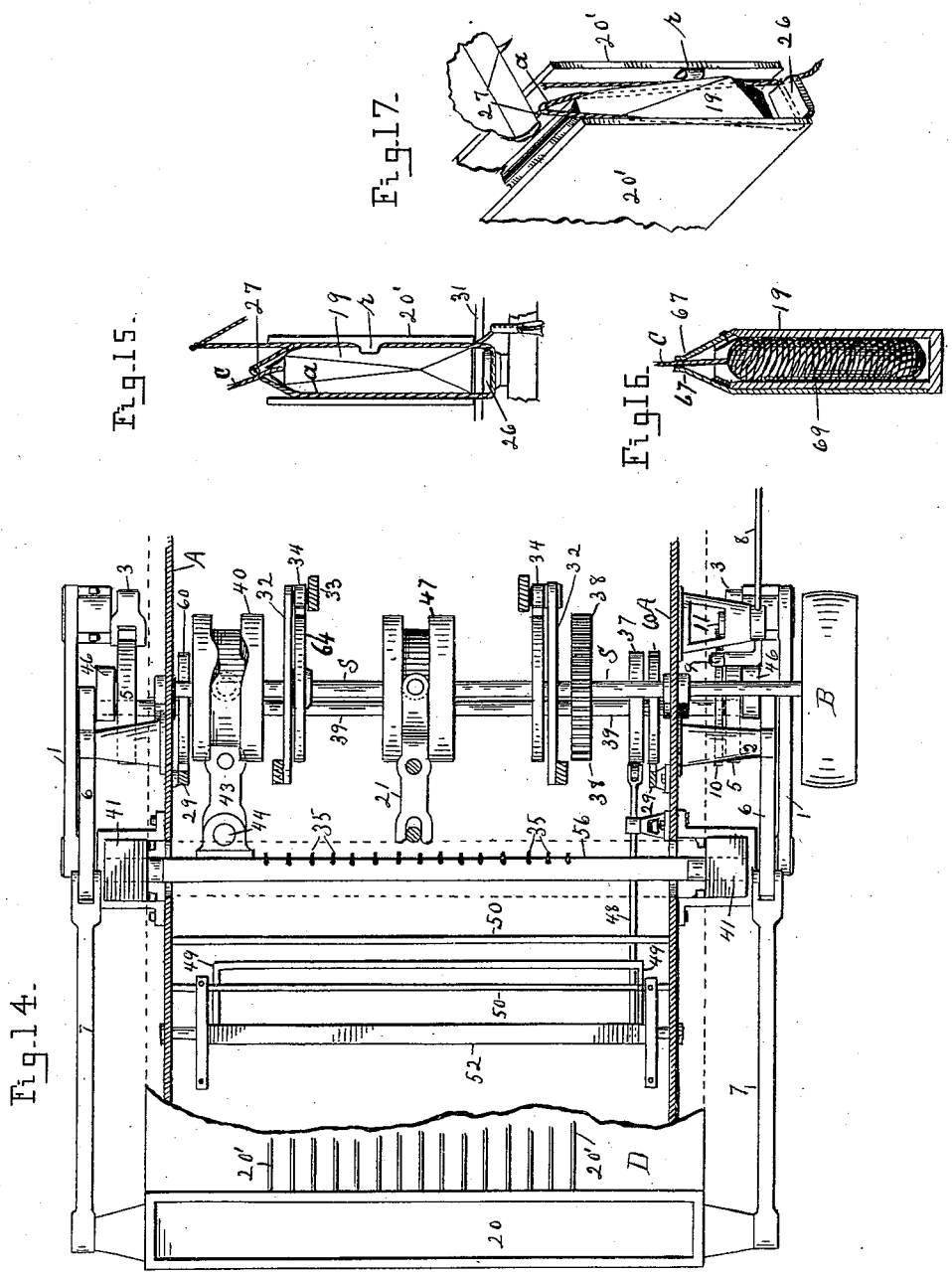

UNITED STATES PATENT OFFICE.

SAMUEL H. ROBERTS, OF JOLIET, ILLINOIS.

MACHINE FOR MAKING NETS.

SPECIFICATION forming part of Letters Patent No. 565,232, dated August 4, 1896.

Application filed June 20, 1895. Serial No. 553,402. (No model.)

*To all whom it may concern:*

Be it known that I, SAMUEL H. ROBERTS, a citizen of the United States of America, residing at Joliet, in the county of Will and State of Illinois, have invented certain new and useful Improvements in Machines for Making Nets, of which the following is a specification, reference being had therein to the accompanying drawings, and the letters and figures of reference thereon, forming a part of this specification, in which—

Figure 1 is a side elevation of the machine, parts being broken away to show its interior construction. Fig. 2 is a plan view. Fig. 3 is a vertical section through the knot-forming mechanism, looking at the side of one of the oscillating hooks and of one of the reciprocating pins over which a knot is formed. Fig. 4 is a view of the loop-forming mechanism, showing the loop in its several stages of formation. Fig. 5 is a view of a knot such as is formed by the said loop-forming mechanism. Fig. 6 is a side view of one of the shuttles. Fig. 7 is an end view of one of the shuttles. Fig. 8 is an end view of two of the shuttles and of the arms for carrying said shuttles and of a portion of the table of the machine, having a series of grooves in which said arms rest and are guided. Fig. 9 is a plan view of one of the shuttles and a pair of arms for carrying said shuttle. Fig. 10 is a side view of a cam-wheel and of the shuttle-carrier crank attached thereto. Fig. 11 is a perspective view of a portion of a bar and a series of cord-carrier arms attached thereto for carrying one of the cords around the oscillating hooks and reciprocating pins. Fig. 12 is a longitudinal central section of the shuttle. Fig. 13 is a view showing the reverse directions in which the cord-carrier carries the cord under the hooks and over the pins to form a loop. Fig. 14 is a plan of a portion of the machine, omitting the net and a portion of the table-top. Fig. 15 is an end view of the shuttle and of the shuttle-carrier arms, showing the shuttle as it would appear passing through a loop of the cord and showing the shuttle-carrier arms outside the loop and arranged so as to leave space enough between them and the shuttle so the cord forming the loop can pass between the shuttle and its carrier-arms. Fig. 16 is a vertical section of the shuttle, showing its spring-tension and a ball of twine in the shuttle; and Fig. 17 is a perspective view showing a portion of the shuttle and its carrier-arms and the loop-forming parts and showing the shuttle as it would appear when just entering a loop and showing how the shuttle-carrier arms permit the loop to pass between them and the shuttle.

This invention relates to certain improvements in machines for making nets, which improvements are fully set forth and explained in the following specification and claims.

Referring to the drawings, A represents the main frame of the machine, having a table-top D, provided with a series of longitudinal grooves Z for use as guides for the arms 20' of the shuttle-carrier, and is provided also at or near its outer end with a pair of take-up rolls 16 and 17 for taking up the finished net N. Two sets or series of cords $a$ and $c$ are used to form the net, and the principal object of the device is to connect the two series of cords to form meshes, connecting said cords by means of such a knot as is shown in Fig. 5. The series $a$ of cords (or warp-cords) proceed from some adjacent spool or reel (not necessary to be shown) and pass over a cam-shaft 51 and under a cross-beam 52, and from thence through eyes in the cross-bars 50 50, and through eyes in the swinging cross-bar 49. From thence they are threaded through the hollow upper ends of the series of cord-carrying fingers 35, secured at their lower ends in the reciprocating cross-bar 56, and from thence, after being connected with the other cord $c$ by means of a knot in the form of a finished net, to the take-up rolls 16 and 17, and between them to some receptacle. (Not necessary to be shown.) The other cord $c$ comes from a shuttle 19, and, after being connected with the other cord $a$ by means of a knot in the form of a finished net, passes to the said rolls 16 and 17.

27 represents a series of reciprocating pins on which the knots are formed and which are withdrawn from the knots after they are tightened by the take-up mechanism.

26 represents a series of flat oscillating hooks, corresponding in number with said pins, around which hooks and pins the cords

*a* are passed to form loops, through which loops the other cord *c* is passed by means of the shuttles to form the knots.

31 is a sliding cross-bar for removing the cords *a* from the hooks 26 after the shuttles have passed through the loops, in order that the knots may be drawn up tight around the pins 27.

20 is a cross-head provided with the series of horizontally-extending arms 20', between which arms the shuttles 19 lie and by which the shuttles are moved back and forth through the loops formed in the cords *a* on said hooks and pins as said head, with its said arms and shuttles, is reciprocated back and forth, as will be hereinafter explained.

Each hook 26 has a short shaft passing down through a box in the table-top D, which shafts are each provided on their lower end with pinions 25, which mesh with a toothed rack 24, by means of which said pinions are simultaneously oscillated in either direction for the purpose of twisting the loops in cord *a*, formed on said hooks and pins.

S is the drive-shaft, journaled near each end in suitable boxes in the sides of the machine-frame, and is provided on one end with a drive-pulley B, to which a drive-belt may be applied.

39 is another shaft arranged parallel with said drive-shaft, and is provided with a pinion 46, which meshes with a drive-gear 38 on drive-shaft S, from which gear mechanism said shaft 39 is driven.

41 is a pair of vertically-sliding bars boxed, respectively, to the sides of the machine-frame, which sliding bars carry a cross-bar 56, having its ends respectively arranged in boxes in said sliding bars, so said bar may be reciprocated between said sliding bars by means of a cam-wheel 40 on drive-shaft S through the medium of a lever 43, fulcrumed at 22 to a bracket attached to the main frame, and not necessary to be shown, and having a roller-wrist 23, adapted to run in the peripheral channel of said cam-wheel 40. The opposite end of said lever 43 is forked over a vertical port 44, attached to the cross-bar 56 in such manner as to permit said bar to be vertically moved, by means of the sliding bars 41, through the medium of the bell-cranks 1 3 and cam-wheel 5 on shaft 39, the long arms 1 of said bell-cranks being connected with said sliding bars 41 by means of links 42. The short arms 3 of said bell-cranks are provided with a friction-roller 4 for engaging the periphery of cam-wheel 5 on shaft 39, as shown more particularly in Fig. 1.

It will be seen that by means of such connections the said bar 56, having the arms 35 for carrying the cords *a*, has both a vertical and horizontal motion for the purpose of carrying cords *a* under hooks 26 and up over pins 27, so as to form the loops in said cords, through which the shuttles 19 carry the other cords, *c*, in order to form the knots.

61 is a horizontal bar, (shown in section in Fig. 3,) and is provided with a series of horizontally-projecting pins 27. It is moved back and forth, so as to withdraw said pins from the knots after they are formed, by means of the cam-wheels 60, arranged on shaft 39, one near each end thereof, as shown in Fig. 14, through the medium of levers 29, fulcrumed at 30, as shown in Fig. 1, on a bracket of frame A, and the links 28, connecting the upper ends of said levers with the respective ends of the bar 61, the lower ends of said levers being provided with friction-rollers for respectively engaging the cam-wheels 60. A coil-spring, as shown in Fig. 1, returns said bar and pins after being withdrawn from the knots, as aforesaid.

The rack 24, meshing with pinions 25 of hooks 26, is reciprocated by means of the cam-wheel 47 on drive-shaft S through the medium of lever 21, fulcrumed at 22 to a bracket projecting from the under side of the table-top D, as shown in Figs. 1 and 2. The friction-roller of said lever 21 travels in the peripheral cam-channel of said cam-wheel 47, as indicated in broken lines in Fig. 2, the channel of said cam-wheel 47 being formed so as to reciprocate said rack 24 back and forth once at each revolution of the machine.

20 is the shuttle-carrier head, having attached thereto a series of forwardly-extending arms 20', arranged at regular intervals and of sufficient distance apart so the shuttles 19 can lie between them, as shown in Fig. 2, and more particularly in Figs. 8 and 9, and also in Figs. 15 and 17. These shuttles rest upon the table-top D and are carried back and forth through the loops in cord *a* by means of their engagement with the lugs *r* on the sides of said arms arranged to engage and carry the shuttles, but the shuttles lie loosely between said arms and lugs, so that the loops formed in the cords *a* may pass between said shuttles and arms, as shown more particularly in Fig. 9, and also in Figs. 15 and 17.

The table-top D is provided with grooves Z, (shown in Fig. 8,) in which the arms 20' move and are guided, so said arms may not spread apart and drop the shuttles.

Reciprocating motion is given the shuttle-carrier and its shuttles by means of lever 6. This lever is connected at its upper end with the shuttle-carrier head 20 by means of connecting-rod 7, and is fulcrumed at 2 on a bracket shown in Fig. 2 particularly attached to the frame A. The lower end of said lever 6 is pivotally connected to one end of a link 63, and the other end of said link is cranked to the side of cam-wheel 5 on shaft 39, as shown in Fig. 1. The distance between the centers of said crank and the point of attachment of said link 63 and lever 6 is greater than the distance between the center of said crank-pin and the center of wheel 5, as shown in broken lines in Fig. 1, so that when said cam rotates said lever 6 and shuttle-carrier will be moved from the position shown in the full lines to that shown in broken lines in Fig. 1.

31 is a cross-bar arranged on a plane immediately above the hooks 26, and is for the purpose of being moved forward to remove the cords $a$ from the hooks, so a take-up mechanism may pull said cords up on said pins to form the knots. Said bar 31 is reciprocated by means of a cam-wheel 64 on drive-shaft S (shown in broken lines in Fig. 1) through the medium of lever 33, fulcrumed at 34 to a bracket, and connecting-rod 32 connecting the upper end of said lever with said cross-bar, the lower end of said lever 33 being in contact with said cam-wheel and held in such contact by a coil-spring. (Shown in Fig. 1.)

8 is a rod provided on its lower end with a friction-roller for engaging the cam-wheel 10 on shaft 39, and after passing through a swivel-box 11, near its lower end, is connected at its upper end with the long arm of bell-crank 13, the short arm of said bell-crank being provided with a pawl 18 for engaging the teeth of ratchet-wheel 15 on the end of roller 16, by means of which cam and pawl and ratchet mechanism said roll and also roll 17 are intermittently rotated in order to take up the finished net N, that passes between them. A detent-pawl 14 prevents backward rotation of said rolls.

The shuttles 19 are provided with a receptacle for holding the cords $c$ in the form of a flattened ball, and the ball is intended to be unwound from the inner side, so as to prevent the cord from tangling in the shuttle, and passes out near one end of the shuttle over a pulley 68 and between a pair of tension spring-plates 67 for holding the said cord by a slight tension as it is drawn from the shuttle to prevent it from tangling or leaving the shuttle too fast, which spring-plates are shown particularly in Fig. 16, and which consist of a pair of plates secured one on each side of the shuttle by means of screws, as shown in Fig. 6, and arranged so that their upper edges meet, but permit the twine or cord $c$ to pass between them, and bring sufficient tension on the cord for the purpose stated. One of said spring-plates extends down over the side of the shuttle, as shown in Fig. 16, to cover the cord-receptacle of the shuttle shown in Fig. 12, while the opposite spring-plate does not extend down over the side of the shuttle side, and has its lower edge secured to the side of the shuttle near its upper edge by means of screws, as shown in Fig. 16.

The cord-carriers 35 move in a path to carry cord $a$ around the hooks and pins, as shown in broken lines in Fig. 13, the first move being, as shown in broken lines at the left of the figure, first horizontally, then vertically, then horizontally in the opposite direction from its first horizontal movement, then down to its starting-point. Its next movement would be to the right, then vertically, then horizontally in the opposite direction from its first horizontal move, and then down to its starting-point. This reverse movement of said cord-carriers is caused by the form of the cam-wheel 40, its cam-channel on one side being reverse in form from that on its opposite side.

In operation the first movement of the machine will cause the bar 56, having the cord-carriers 35, to move, as described, through the medium of the cam and lever mechanism 40 and 43, in order to carry the cords $a$ under the hooks 26, then up over the pins 27, and then down to their first position, which forms a loop in said cord, as shown in Figs. 3 and 4. Looking at Fig. 4, the loop at the left side of the figure is supposed to have just been formed, as described. The three loops shown in said figure represent the loop and knot as it would appear in its three stages of formation. After the loops have all been formed as the one shown at the left in Fig. 4, the next move of the machine causes the shuttles with their cords $c$ to pass through said first-formed loop. This is done by means of the carrier 20 and the lever and crank mechanism 5 6 7 63, hereinbefore described. The cord $c$ is shown in said first-formed loop as having been just passed through its loop and is shown near its upper part. The next movement of the machine will cause rack 24 to move and rotate pinions 25, together with the hooks 26, one-half way around, so as to twist said loop to the position shown in the central loop in Fig. 4, said rack and pinions being operated by cam 47, through the medium of lever 21, as hereinbefore stated. When the loop is in the twisted form shown in the central loop in Fig. 4, the shuttles move back through the loops to carry the cord $c$ to the position shown in said central loop in Fig. 4, where it remains until said rack returns and oscillates the hooks back to their first position, as shown by the loops at the right in said Fig. 4. The next movement of the machine causes the cross-bar 31 to move forward against the loops on the hooks and cast said loops off free from the hooks, the said bar being thus moved by means of the cam-lever and link mechanism 32 33 64, hereinbefore described. After the loops have thus been cast off from the hooks the take-up 49 is moved by means of the cam 37, rod 48, and its crank 49, so as to depress cord $a$ between cross-bars 50, through which they are threaded, and cause the loops to be drawn up tightly on the pins 27, said cords $a$ being held during said take-up by means of cam 51 and cross-bar 52, between which said cords pass, as hereinbefore stated. Said rod 48 passes through an eye in the end of a projecting stud, as shown in Fig. 14, by means of which its end engaging said cam is supported and guided. The loops all having thus been drawn up tightly on said pins, the said pins are then withdrawn by means of the cam and lever mechanism 60 28 29, hereinbefore described, and the tension applied to said cords $a$ by said take-up mechanism is sufficient to form the knots, one of which is shown in Fig. 5. A series of knots having thus been formed, the take-up rolls 16 17 are caused to rotate far enough to take up the net and stop, so as to leave it in proper position for the formation of the next succeeding series of knots to be formed in like manner.

Having thus described my invention, what I claim as new, and desire to secure by Letters Patent, is as follows:

1. In a machine for making nets the combination of the oscillating hooks 26, reciprocating pins 27, arranged a short distance from said hooks, cord-carriers 35 for carrying a cord around said hooks and pins to form loops in said cords, shuttles and devices for actuating them to carry a second cord back and forth through said loops, means for actuating the hooks to twist said loops, and after the return of the shuttles through said twisted loops to twist the loops back to their first position, bar 31 arranged to reciprocate immediately above said hooks to remove the loops therefrom, levers 33 connecting-rod 32 and cam-wheels 64 for actuating said bar 31, cross-bar 49, rod 48, and cam 5 for operating bar 49, the cross-bars 50 and clamps 51 and 52 whereby the knot is drawn tight all arranged to operate substantially as and for the purpose set forth.

2. In a machine for making nets the combination of the bar 56 having the cord-carriers 35 attached thereto and means for actuating the same, the oscillating hooks 26, the reciprocating pins 27 and means for operating said pins and hooks, cord-removing bar 31 adjacent to the hooks 26, lever 33, connecting-rod 32, cam-wheel 64 for actuating said bar, cross-bar 49, rod 48 and cam-wheel 5 for operating bar 49 cross-bars 50, 50, and clamps 51 and 52 whereby the knot is drawn up tight, all arranged to operate substantially as and for the purpose set forth.

SAMUEL H. ROBERTS.

Witnesses:
 THOS. H. HUTCHINS,
 RAY HUTCHINS.